July 28, 1936.  K. MAYBACH  2,049,127
CLAW COUPLING
Filed July 18, 1933
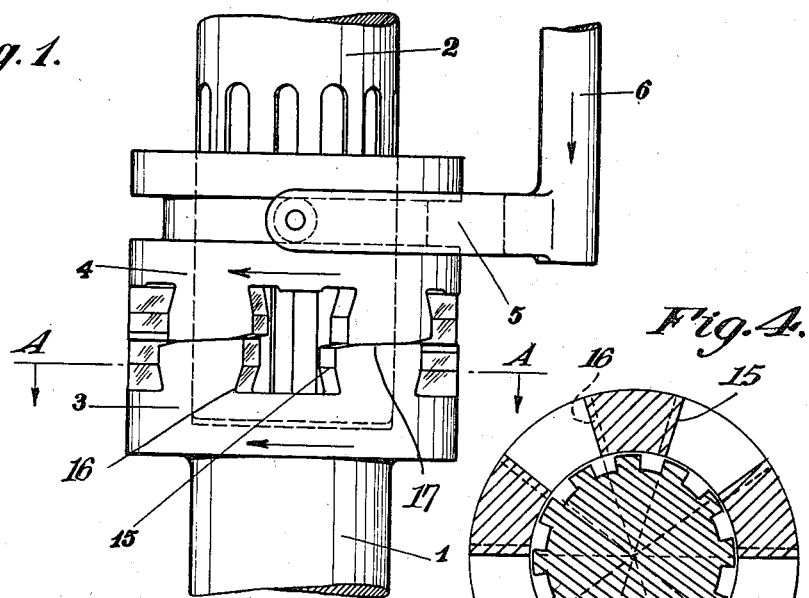
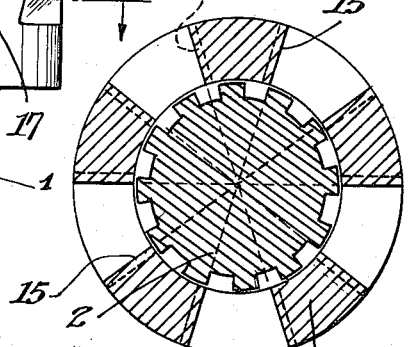
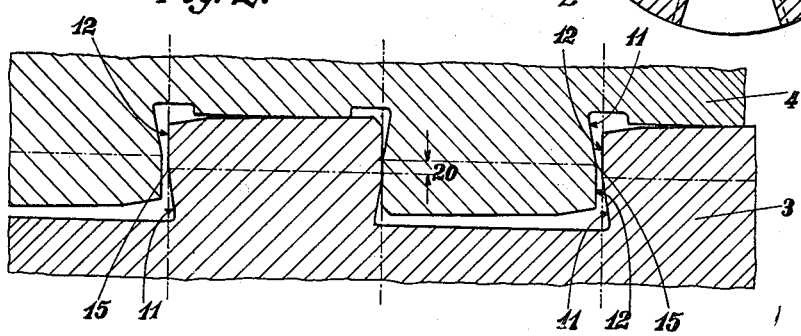
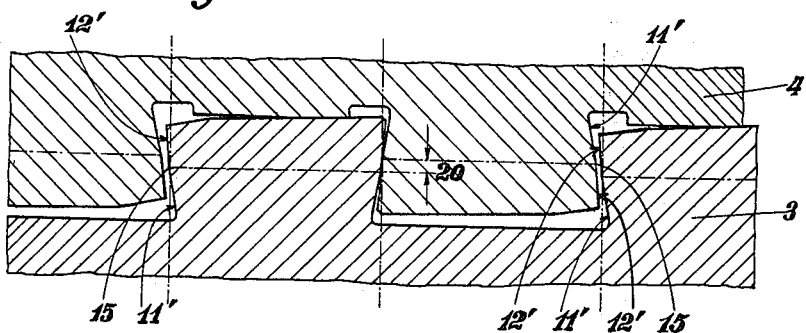
Inventor:
Karl Maybach

UNITED STATES PATENT OFFICE 2,049,127

CLAW COUPLING

Karl Maybach, Friedrichshafen, Germany, assignor to Maybach-Motorenbau G. m. b. H., Friedrichshafen, Germany Application July 18, 1933, Serial No. 680,931
In Germany July 30, 1932

9 Claims. (Cl. 192—67)

My invention relates to claw couplings and has special reference to the shape of the side faces of the coupling teeth. It is of special importance with couplings having teeth with front faces so inclined that the coupling halves when coming into contact on mutual approach do not engage but rattle past each other until the originally slower coupling half out of some reason begins to overrun the originally faster half. Couplings of this kind are for example disclosed in the U. S. Patent Reissue 17,707.

Generally the side faces of the coupling teeth are substantially parallel to each other. The planes of the side faces then are so situated that they meet in the longitudinal axis of the shaft or shafts to which the coupling belongs. If there are slight irregularities in the mounting, or if there is play in the bearing, or if the two shafts to be coupled are not in exact alignment, the side faces of the coupling teeth when engaged do not bear against each other as they should, and because of their relative inclination the teeth are apt to work and to come slowly out of engagement against the will of the operator.

My invention avoids such draw-back by providing side faces of the coupling teeth which are broken in such manner that every face is formed of two planes, one for the upper portion of the tooth and the other one for the lower or root portion thereof. These two planes are so directed that they together in their median direction cause the tooth to be broader or wider at its upper portion than at its root portion. The line on which both planes meet in all events has to be part of a radius through the axis of the shafts to which the coupling belongs.

According to my invention the teeth when coupled will not get out of engagement because of slight irregularities or the like, but they will always bear against each other on the meeting lines of the planes forming the side faces. After some time of use the bearing lines will have worked out to narrow bearing planes.

It is not entirely necessary according to the invention that originally the planes of the side faces of the teeth meet in the axis of the shaft to which the coupling belongs. The planes themselves may show a slight inclination with regard to such a radial plane, as is the case for example with teeth which have bevelled side faces, but the meeting line of such two planes which, according to my invention, forms the side face should go through the axis of the shaft. This line will wear down into a narrow surface, so that such surfaces bear against each other when the teeth are in engagement. The meeting line defining the boundary between the upper and lower portions of the side faces are so located that when the coacting teeth are in engagement such teeth will make bearing contact along the meeting lines, and hence the meeting lines will be located at substantially half the height of the teeth. Rather than have the teeth engage with the meeting lines of their respective side faces in exact coincidence, it is preferred to locate the meeting lines of the coacting side faces so that such lines will be slightly offset from each other, say $\frac{1}{32}$ of an inch, when the teeth are in engagement, thus to provide restricted surface contact to an extent determined by the amount of offset between the meeting lines.

In certain cases it may be advisable to shape the side faces of the teeth so that there is a very small surface contact from the beginning, for instance over the afore-mentioned small distance between the meeting lines of the broken side faces.

The drawing represents two examples embodying my invention.

Fig. 1 is a side view of a claw coupling.

Fig. 2 shows diagrammatically the shape of the claw teeth in section, part of the circumference of the coupling being developed in the drawing plane.

Fig. 3 corresponds to Fig. 2, but a different shape of the teeth is represented therein, giving another example of the invention.

Fig. 4 is a cross section taken on line A—A of Fig. 1.

Shafts 1 and 2 are substantially in alignment with each other. Claw coupling half 3 is rigidly fixed to shaft 1 and coupling half 4 is splined to shaft 2 adapted to be shifted by means of forked member 5. Both coupling halves rotate in the direction shown by the arrows in Fig. 1, but at first coupling half 3 rotates faster than coupling half 4. Therefore, during this period the teeth do not engage but rattle past each other, because of the direction of the inclination of the front faces of the teeth which causes a rejecting impulse on the coupling halves as long as they rotate in the above described relation to each other.

The same conditions prevail in case shaft 2 and coupling half 4 be rotating in the direction opposite to that of shaft 1 or that they be at a standstill while shaft 1 is rotating in the direction of the arrow.

As soon as the relative sense of rotation changes—which may occur by shaft 2 overrunning shaft 1 or by shaft 1 coming to a standstill or beginning to rotate in the direction opposite to the arrow—the claw teeth come to engagement, because of forked member 5 being pressed in the direction of arrow 6, which pressure may be exerted by manual force or by a spring, as for example, in the aforementioned U. S. Patent Reissue No. 17,707.

If, as explained above, the mounting of the parts concerned is not exact the coupling halves during their working while engaged would tend to slide backwards out of engagement again; but because of the side faces of the teeth being broken—according to my invention—this disadvantage is obviated.

Every side face of the teeth consists of an upper portion 12 or 12' respectively, and a lower portion 11 or 11', respectively. Both portions meet in meeting line 15 which is in Figs. 2 and 3 simply a point. These meeting lines 15, if extended, meet each other in the axis of the shafts, as shown in Fig. 4. In the example represented in Fig. 2 the upper portions 12 of the side faces of every individual tooth are substantially parallel to each other looking lengthwise of the tooth although converging transversely towards the axis of the shafts, whereas in Fig. 3 the corresponding upper portions 12' converge towards the root of the tooth. In both cases the lower portions 11 and 11', respectively, converge towards the root. Thus the teeth are narrower at their root than at their top.

The meeting lines 15 of the teeth belonging to coupling half 3 and to coupling half 4, respectively, do not coincide when the teeth are in engagement but have a small distance 20, as is shown by dotted lines. In the example represented in Fig. 2 the teeth have a narrow surface contact within the dimension 20 from the beginning, whereas in the example of Fig. 3 there is only line contact at first which will wear down to a similar surface contact.

In the example represented both front faces 17 of the coupling teeth are inclined, but every expert will easily understand that my invention is as well applicable to coupling teeth with straight front faces or other shapes.

On the whole, I do not want to be limited to details, described or shown in the drawing, as many variations will occur to those skilled in the art.

What I claim is:

1. A claw coupling comprising two shafts substantially in alignment with each other, a coupling half on each of said shafts, said coupling halves each having teeth with two side faces, said side faces having an upper and a lower portion being inclined at different angles but both converging towards the root of each of said teeth, said face portions meeting in a line going through the axis of said shafts, said meeting line of the portions of said side faces of one coupling half when in engagement with the other coupling half being situated at a short distance from the meeting line of the portions of said side faces belonging to the teeth of said second coupling half.

2. A claw coupling comprising two shafts substantially in alignment with each other, a coupling half on each of said shafts, said coupling halves each having teeth with two side faces which are spaced apart throughout their length, and an outer end face at the upper extremities of said side faces, both side faces having an upper and a lower portion which lie in angularly related planes and meet each other in a line going through the axis of said shafts, said meeting line being situated at substantially half the height of the tooth.

3. A claw coupling comprising two shafts substantially in alignment with each other, a coupling half on each of said shafts, said coupling halves each having teeth which are wider at their upper ends than at their roots and having two side faces, both side faces having an upper and a lower portion which lie in angularly related planes and meet each other in a line going through the axis of said shafts, said meeting line being situated at substantially half the height of the tooth.

4. A claw coupling comprising two shafts substantially in alignment with each other, a coupling half on each of said shafts, said coupling halves each having teeth which are wider at their upper ends than at their roots and having two side faces, both said side faces having an upper and a lower portion which lie in angularly related planes and meet each other in a line going through the axis of said shafts, said upper portions of said side faces of each individual tooth lengthwise of the tooth being substantially parallel to each other.

5. A claw coupling comprising two shafts substantially in alignment with each other, a coupling half on each of said shafts, said coupling halves each having teeth which are wider at their upper ends than at their roots and having two side faces, both said side faces having an upper and a lower portion inclined to each other and meeting in a line going through the axis of said shafts, the upper portions of said side faces and the lower portions of said side faces both converging towards the root of said teeth.

6. A claw coupling comprising two shafts substantially in alignment with each other, a coupling half on each of said shafts, said coupling halves each having teeth which are wider at their upper ends than at their roots and having two side faces, said side faces having an upper and a lower portion angularly related to each other and meeting in a line going through the axis of the shafts, the meeting line of the side face portions of the teeth of one coupling half, when said coupling half is engaged with the other coupling half, being offset a short distance from the meeting line of the coacting side face portions of the teeth of said other coupling half.

7. A claw coupling comprising a pair of substantially aligned opposing coupling halves formed with claw teeth having interengageable side faces, said coacting side faces having upper driving face portions and adjoining lower face portions inclined to said upper face portions, said lower face portions undercutting said upper face portions and being adapted to limit the area of contact between said coacting side faces to a restricted portion of their total surfaces when the teeth are engaged.

8. A claw coupling comprising a pair of substantially aligned coupling halves formed with interengageable claw teeth, each tooth having opposite side faces which converge transversely towards the coupling axis, the engageable side faces of opposing teeth each having angularly related adjoining plane surfaces which meet in a line extending radially to the coupling axis and which comprise upper driving face portions and lower face portions which undercut said upper face portions, the upper driving face portions of the opposing teeth making substantially line engagement along the radial meeting lines between the adjoining face portions when the coupling halves are fully interengaged.

9. A claw coupling comprising a pair of substantially aligned coupling halves formed with interengageable claw teeth, each tooth having opposite side faces which converge transversely towards the coupling axis, the engageable side faces of opposing teeth each having angularly related adjoining plane surfaces which meet in a line perpendicular to the coupling axis and which comprise upper driving face portions and lower face portions which undercut said upper face portions, the upper driving face portions of the opposing teeth making restricted surface engagement with each other along the meeting lines between the upper and lower face portions when the coupling halves are fully interengaged.

KARL MAYBACH.